N. AUBIN.
Making Oil and Water Gas.
No. 680. Reissued Apr. 5, 1859.
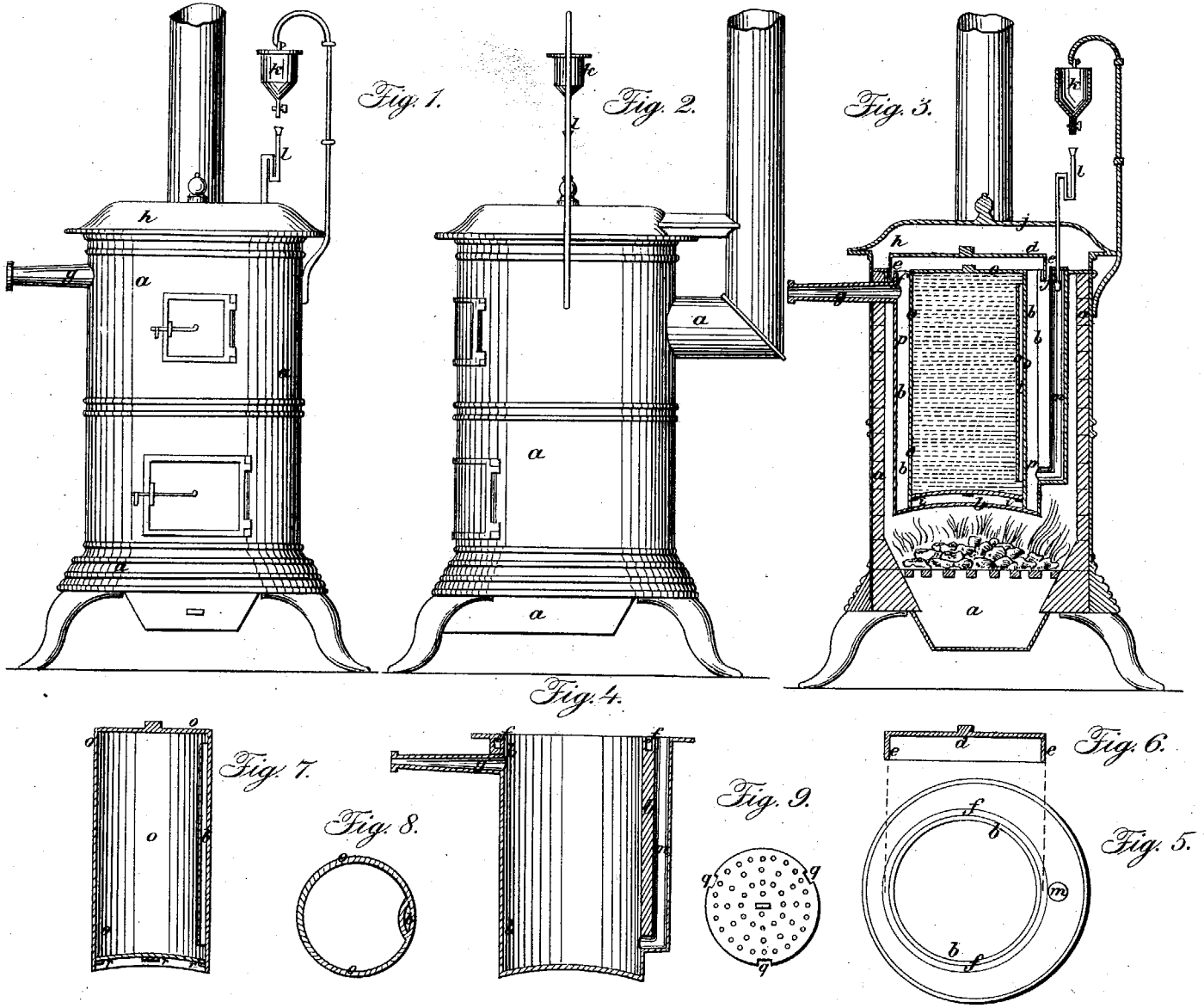
AM. PHOTO-LITHO.CO. N.Y. (OSBORNE'S PROCESS.)

UNITED STATES PATENT OFFICE.

N. AUBIN, OF ALBANY, NEW YORK.

IMPROVEMENT IN GAS-GENERATORS.

Specification forming part of Letters Patent No. 14,045, dated January 8, 1856; Reissue No. 680, dated April 5, 1859.

*To all whom it may concern:*

Be it known that I, N. AUBIN, of the city and county of Albany, and State of New York, have invented certain new and useful Apparatus for the Generating of Illuminating-Gas; and I do hereby declare that the following specification, taken in connection with the drawings, is a full, clear, and exact description thereof.

In the drawings, Figure 1 is a front elevation of a gas-generating apparatus. Fig. 2 is a side elevation of the same. Fig. 3 is a vertical section through the apparatus. Fig. 4 is a vertical section through the retort proper. Fig. 5 is a top view of the same. Fig. 6 is a vertical section through the cover. Fig. 7 is a vertical section through the interior chamber or container of materials and charger, Fig. 8 being a horizontal section through the same, and Fig. 9 a plan of the bottom thereof.

The invention which this present description is designed to set forth is to be found in a peculiar construction of the apparatus by which gas of a definite and reliable quality may be obtained with a minimum amount of fuel and with little danger of clogging up the apparatus by charcoal, lamp-black, or other residuum, while the same construction affords great facility for charging the materials and the removal of the residuum; and to this end the nature of my invention consists in combining with a gas-retort an interior removable chamber, open at the bottom when in use, and so shaped that the gas or vapor is forced to pass between its exterior and the interior of a retort, the chamber being substantially such and so arranged as hereinafter specified.

In the apparatus shown in the drawings a suitable furnace, provided with doors, grate, ash-pit, and chimney, is represented at *a a a*, and within the furnace is located a retort, *b b b*, made of cast-iron or other suitable material and of any proper shape. In the present instance it is represented as cylindrical, with a bottom dished upward. The retort has cover *d*, which may be made gas-tight to the retort by any suitable means. In the present instance the cover is provided with a rim, as at *e*, which fits into a groove, *f*, which is to be filled with fusible metal or alloy, fusing at a heat below that to which the retort is exposed when in use. The retort has a neck, *g*, through which the gas as made is carried off, and covering the cover is a dome, *h*, having in it a hole covered with another cover, *j*, this last cover being larger than that of the retort. The interior of this dome is connected with the chimney by a pipe, and the object of the contrivance is to prevent any escape of gas or vapor when the retort is open. There is also shown attached to the apparatus a water-reservoir, *k*, a feeding-siphon, *l*, and steam-generator *m*, to be filled with pieces of coke or broken brick, and connecting at bottom with the retort. This apparatus and the dome have no necessary connection with the invention herein set forth. The interior removable chamber, made of metal, is shown at *o o o* so shaped as to conform with tolerable precision to the interior of the retort, and leaving a space between it and the retort, as at *p p*. This case is represented as cylindrical, and is closed at top gas-tight, either permanently or by a removable cover, but open at bottom; it, however, has a grating or pierced metal bottom, shown specially in Fig. 9. This bottom may be secured in any suitable manner admitting of easy removal and replacement, a convenient way being to cut in it notches, such as shown at *q q*, and to provide the chamber with corresponding lugs *r r*, the construction being such that the bottom may be slipped into the chamber over the lugs and beyond them and then turned partially round, when it cannot get out until again revolved so that the lugs coincide with the notches. The chief use of this bottom is to prevent the falling out of material while the interior chamber is being put in place or removed from the retort, this chamber being practically open-bottomed as far as its use in making gas is concerned. This interior chamber has inclosed within it a pipe, *t*, open at both ends and making communication between the top and bottom of the chamber, so as to equalize pressure and facilitate escape of gas or vapor in case the chamber should be choked solid by the melting and running together of its contents; but this contrivance is a theoretical nicety sometimes, but rarely useful, and not essential.

In preparing the apparatus for use fire is lighted and the furnace and retort heated up. The dome is then removed, and the retort-cover lifted off. The interior chamber is then lifted out, its bottom removed, and its cavity filled with suitable materials from which gas can be generated by the action of heat. I fill it, by preference, with rosin, grease, or bitumen, or rich coal mixed with sawdust, broken brick, or charcoal. When filled, the bottom is inserted and secured and the chamber with its contents rests on the bottom of the retort, in a position substantially such as shown in Fig. 3. The retort-cover is then replaced, making its own joints, if fusible metal be used, and if the steam apparatus be employed water is placed in the reservoir and the generator filled with broken brick or coke. The exposure of the materials to heat softens them and distills off hydrocarbon vapors, perhaps also producing some oils or tars, and these and the vapors descend through the bottom of the interior chamber, where the whole becomes vapor, which escapes under its lower edge into the space between the two chambers, where these vapors rise in contact with the highly-heated surface of the retort, and during their passage are by heat changed into incondensable gas. They pass out under the edge of the chamber, partly owing to the fact that the joint between that edge and the bottom is not a tight one, and partly owing to the fact that the elastic force of the vapor lifts the chamber, which, as it were, dances up and down as the vapors escape. Such is the theory of the action of the apparatus which I have formed and on which my invention was based. I believe that it is a true one, and that the processes going on within the retort are such as I have set forth. Whether my theory be true or not is, however, unimportant, as the results, owing to the use of the apparatus, are certainties, and these are as follows: A large percentage of gas from a given quantity of material, a small percentage of fuel expended in proportion to the quantity of gas made; little or no clogging of the inner surface of the retort by solid carbonaceous matter; perfect facility in cleansing the retort and in charging the material and removing the residuum. When the steam apparatus was used in experimental trials there was no deposit of carbon, but even without it there is no deposit of any serious quantity. When rosin or grease or bitumen is used for gas-making, the apparatus possesses still greater advantages over those usually employed, as by means of the charger these materials can, when mixed with coke or charcoal or sawdust, or such like materials, be used economically without any prior melting or apparatus for dropping them when melted into the retorts.

Now, I am aware of the fact that a removable charger or interior chamber open at top has been used in ordinary D retorts, solely as a ready means of inserting material and withdrawing residuum, and also that gas-retorts have been constructed with a stationary or non removable interior chamber, open both at the top and near the bottom, the top grating serving as a support for wood, which it was believed would there part with its oils and tar, which would drop into the reservoir below; but such an arrangement would not serve my object for two reasons: first, because the apparatus was not so constructed as to cause all the hydrocarbon vapors to be heated uniformly by passing for the same distance between the interior and exterior chambers in close contact with the highly-heated surface of the retort; and, second, because the interior chamber was not removable. The first of these peculiarities of construction prevented the attainment of a uniform quality of gas and also of a high percentage thereof, and the second afforded no facility for charging material or removing residuum, or for cleansing the interior of the retort. In neither of these apparatus could the operations which I have assumed as going on within the retort take place. I therefore do not claim, simply, a pan or charging-vessel open at the top, in combination with a gas-retort, nor do I claim a stationary interior chamber open near the bottom and serving as a receptacle and still for oil that descends from above; but I do claim as of my own invention—

The combination, with a gas-retort, of a removable interior chamber open at bottom and having such relative shape with regard to the retort and so located therein, substantially as is specified and for the purposes hereinbefore set forth; and this I claim irrespective of the location of the opening through which said removable chamber can be introduced or withdrawn, and either with or without an apparatus for introducing steam into the retort.

In testimony whereof I have hereunto subscribed my name, in the city of Albany, on this 27th day of March, A. D. 1858.

N. AUBIN.

In presence of—

CHARLES KNICKERBOCKER,
R. J. WILTON.